United States Patent [19]
Szadkowski

[11] Patent Number: 5,322,149
[45] Date of Patent: * Jun. 21, 1994

[54] DAMPED DRIVEN DISC ASSEMBLY

[75] Inventor: Andrzej Szadkowski, Fort Wayne, Ind.

[73] Assignee: Dana Corporation, Toledo, Ohio

[*] Notice: The portion of the term of this patent subsequent to May 3, 2011 has been disclaimed.

[21] Appl. No.: 5,413

[22] Filed: Jan. 19, 1993

Related U.S. Application Data

[63] Continuation of Ser. No. 813,702, Dec. 27, 1991, abandoned.

[51] Int. Cl.⁵ .......................... F16D 3/12; F16D 3/62
[52] U.S. Cl. ............................ 192/70.17; 192/106.1; 464/69; 464/84
[58] Field of Search ............... 192/106.1, 70.17, 30 V; 464/69, 84, 100, 101

[56] References Cited

U.S. PATENT DOCUMENTS

| | | | |
|---|---|---|---|
| 1,127,154 | 2/1915 | Andersen et al. | 464/58 |
| 1,642,475 | 9/1927 | Wood | 192/106.1 |
| 1,975,772 | 10/1934 | Davis | 192/106.1 |
| 2,068,963 | 1/1937 | Spase | 192/106.1 |
| 2,114,247 | 4/1938 | Davis | 192/106.1 |
| 2,141,014 | 12/1938 | Nutt | 192/106.1 |
| 3,387,505 | 6/1968 | Rumsey | 74/574 |
| 4,145,936 | 3/1979 | Vincent et al. | 74/574 |
| 4,181,208 | 1/1980 | Davis | 192/106.1 |
| 4,278,161 | 7/1981 | Mower et al. | 192/106.1 X |
| 4,296,851 | 10/1981 | Pierce | 192/106 XD |
| 4,353,444 | 10/1982 | Bionaz | 192/106.1 X |
| 4,480,736 | 11/1984 | Loizeau | 192/106.1 |
| 4,608,883 | 9/1986 | Bopp | 74/574 |
| 4,723,463 | 2/1988 | Reik et al. | 74/574 |
| 4,768,637 | 9/1988 | Bopp et al. | 192/106.1 |
| 4,781,653 | 11/1988 | Nakamura et al. | 464/58 |
| 4,795,012 | 1/1989 | Durum | 192/106.1 X |
| 4,800,996 | 1/1989 | Loizeau | 192/106.1 |

FOREIGN PATENT DOCUMENTS

| | | | |
|---|---|---|---|
| 0294130 | 12/1988 | European Pat. Off. | 192/106.1 |
| 1425224 | 12/1968 | Fed. Rep. of Germany | 464/69 |
| 2188126 | 9/1987 | United Kingdom | |

Primary Examiner—Richard M. Lorence
Attorney, Agent, or Firm—Millen, White, Zelano, & Branigan

[57] ABSTRACT

A damped driven disc assembly comprises a disc concentrically mounted with respect to a hub, wherein the disc is driven by engagement with a flywheel and the hub drives an output shaft. A plurality of pairs of beam springs have first ends secured to the disc and second ends secured to the hub at points angularly spaced, in one embodiment, about 180° from one another and, in another embodiment, about 0° from one another. In a specific preferred embodiment, the assembly includes three pairs of beam springs.

21 Claims, 8 Drawing Sheets

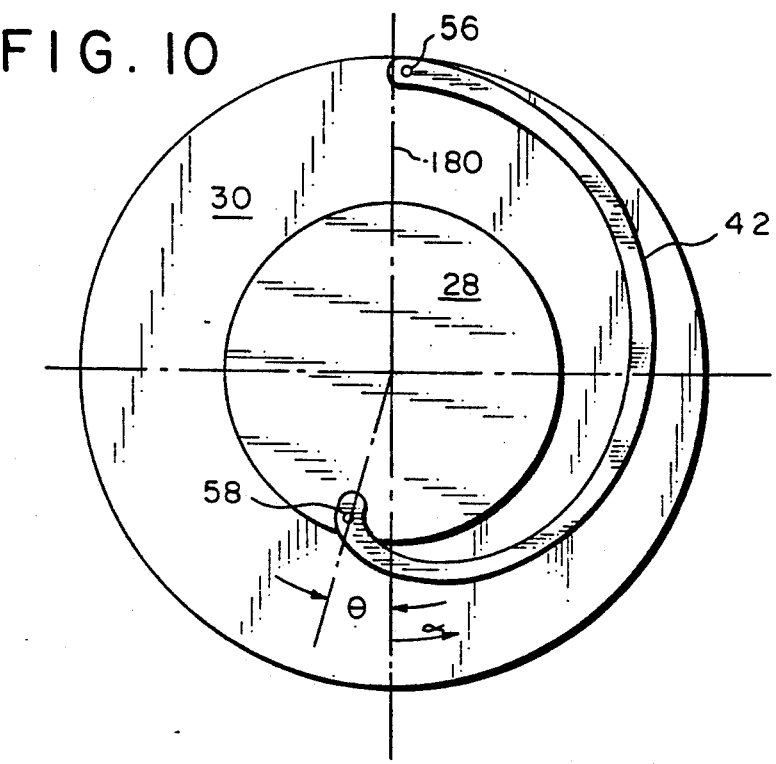
FIG. 10
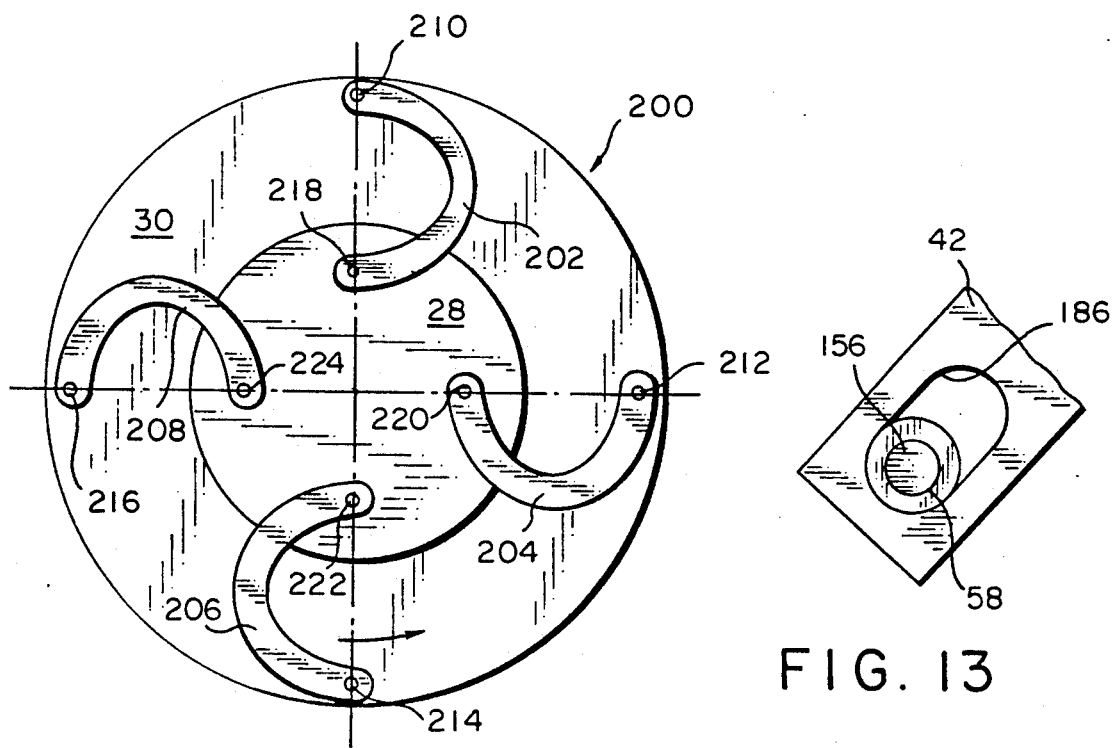
FIG. 12
FIG. 13

DAMPED DRIVEN DISC ASSEMBLY

This application is a continuation of application Ser. No. 07/813,702, filed Dec. 27, 1991 now abandoned.

FIELD OF THE INVENTION

This invention relates to damped disc assemblies. More particularly, this invention is directed to a damped disc assembly wherein damping is accomplished by an assemblage of radially disposed springs.

BACKGROUND OF THE INVENTION

In drive trains for vehicles which include an engine-driven flywheel coupled to a transmission through a clutch, a disc is disposed between the clutch plate and flywheel. There is a tendency for rattling to occur in drive trains of vehicles during both idle and drive modes. The rattle is caused by excessive torsional vibration in the drive train and may be compensated for by a decrease in the elastic rate of the drive train while in its nominal operating range and an increase of travel and torque capacity of a damper associated with the drive train.

The problem has been recognized and addressed in the prior art by coupling the disc to a hub with a damping spring assembly, which spring assembly may include an array of single, helically disposed springs or an arrangement of spiral springs. While these approaches address the problem, they have not done so in a way which is completely satisfactory by adequately lowering the elastic rate of the damping spring assembly while raising the total travel and torque capacity of the damping spring assembly.

SUMMARY OF THE INVENTION

In view of the aforementioned considerations, the instant invention contemplates a disc assembly comprised of a disc and hub concentric therewith, wherein the disc is coupled to the hub by a plurality of beam springs, each of which has first and second ends, with the first ends being anchored to the disc at first locations and the second ends being anchored to the hub at second locations.

In accordance with one embodiment of the invention, the second locations are spaced from the first locations at points angularly spaced from the first location by about 150° to 210°. In accordance with another embodiment of the invention, the second locations are spaced from the first locations by about +30° to −30°.

The instant invention further contemplates the aforedescribed disc assembly in combination with a flywheel, clutch plate, and output shaft, which output shaft is fixed to the hub.

BRIEF DESCRIPTION OF THE DRAWINGS

FIG. 10 is a diagrammatical view of a disc assembly in accordance with the instant invention illustrating the operation of a single spring;

FIG. 12 is a diagrammatical view of a second embodiment of the invention; and

FIG. 13 is an enlarged view of a portion of a spring beam with an oval slot therein for anchoring the beam to the hub with a pin and bushing received therein.

DETAILED DESCRIPTION

Figure 1:
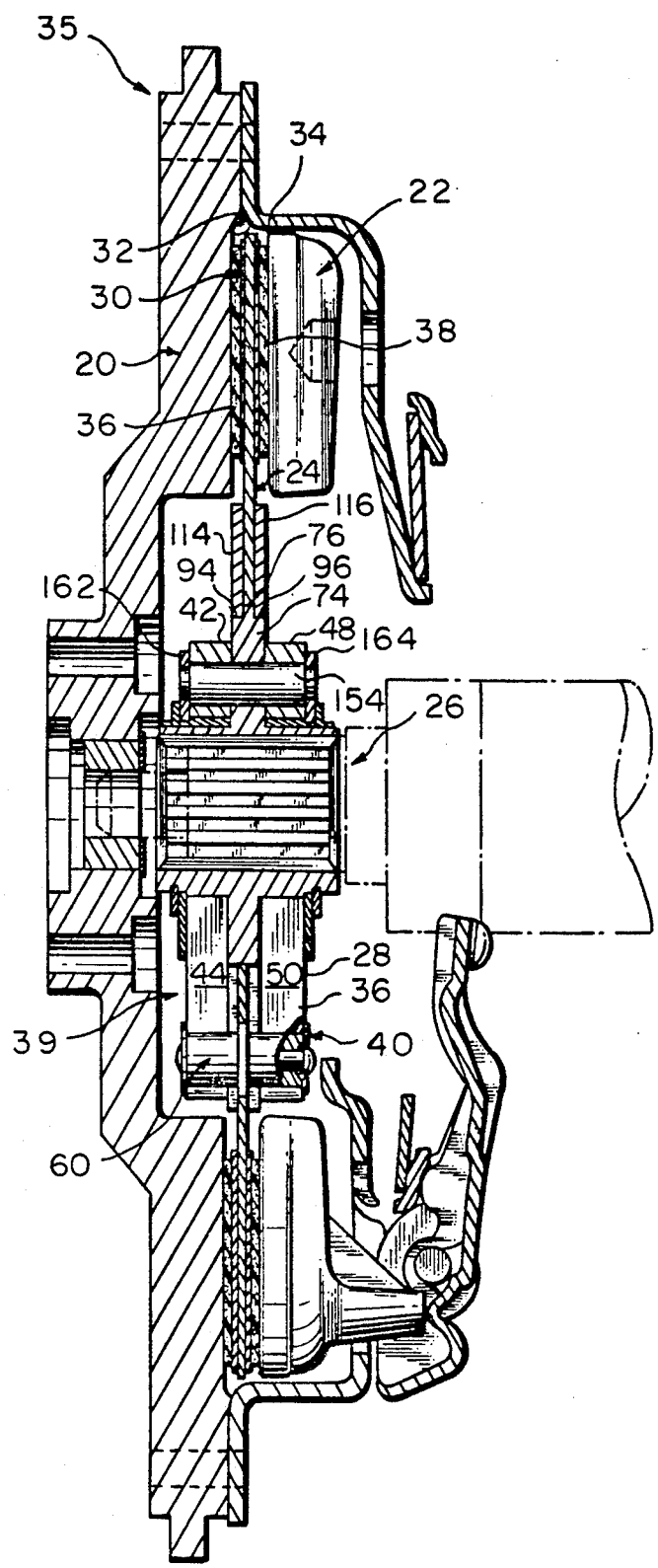
FIG. 1 is an elevational view, partially in section and phantom, illustrating the disc assembly of the instant invention in combination with a flywheel, clutch plate, and output shaft.

Referring now to FIG. 1, there is shown a flywheel 20 and a clutch plate 22 with a disc assembly 24, configured in accordance with the instant invention, disposed therebetween. The disc assembly 24 is splined to an output shaft 26 by a hub 28 and has a disc 30 sandwiched between flywheel face 32 and clutch plate face 34 to form a flywheel-clutch assembly 35. The disc 30 has a pair of oppositely facing friction pads 36 and 38 thereon, which are abutted by the flywheel face 32 and clutch face plate 34 when the clutch plate 22 is engaged so that the output shaft 26 rotates with the flywheel 20. For vehicular applications, the clutch plate 22 is normally engaged so that an engine (not shown) rotating the flywheel 20 positively rotates the output shaft 26 which is connected to a conventional gear box (now shown) in a conventional manner.

In accordance with the principles of the instant invention, two sets, 39 and 40, of radially disposed beam springs are disposed on opposite sides of the disc assembly 24 and resiliently coupled the hub 28 to the disc 30 so that the disc assembly provides a damping element.

As will be explained hereinafter, the sets 39 and 40 of beam springs help provide an anti-rattle environment during both idle and drive modes of the clutch assembly 35. This is accomplished by providing an arrangement which allows one to minimize excessive torsional vibration of the drive line connected through the output shaft 26 in the operating range by decreasing the elastic rate in the nominal operating range while increasing the travel and torque capacity of the disc assembly 24.

Figure 2:
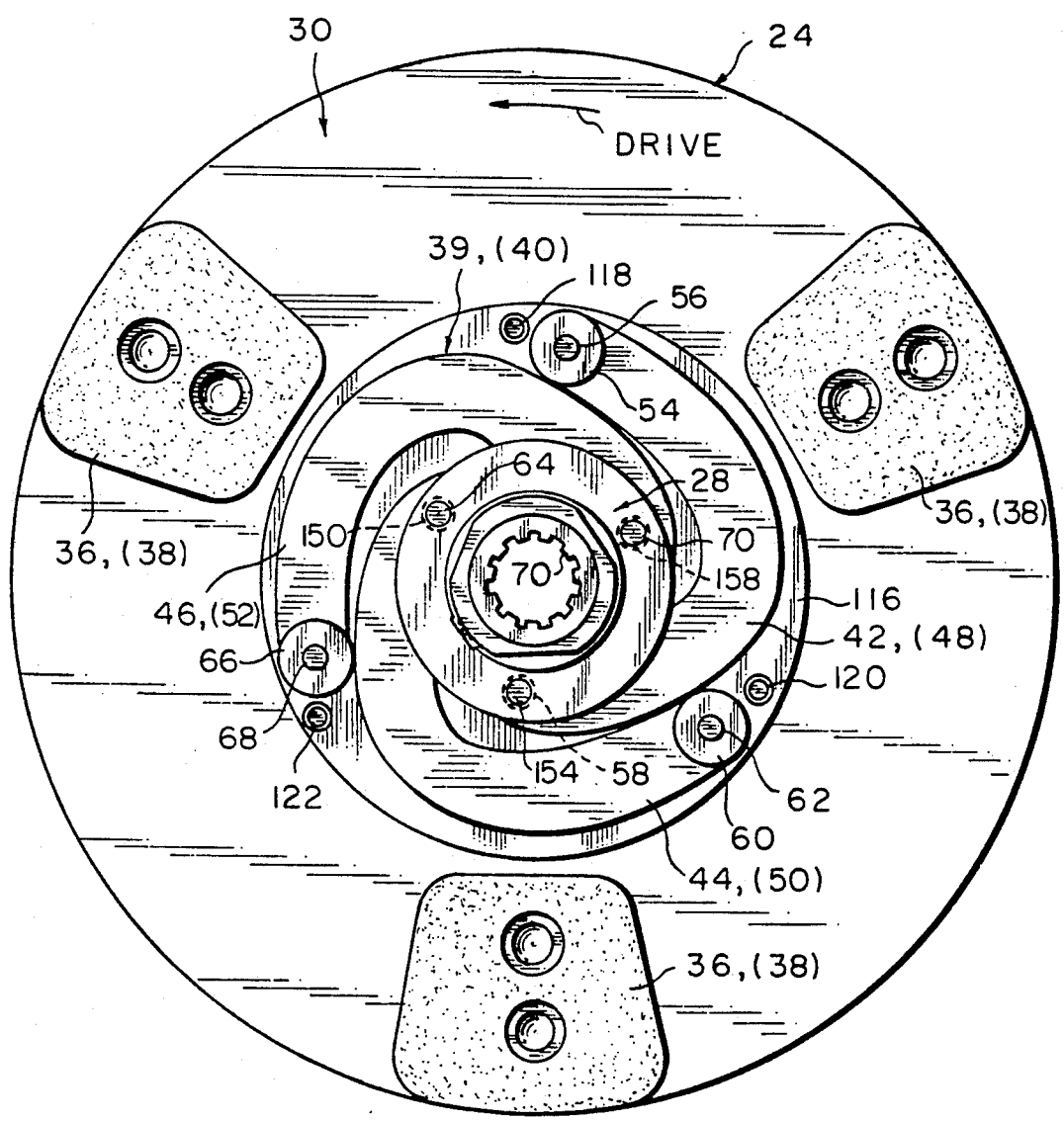
FIG. 2 is a front planar view of the disc assembly utilized with the flywheel, clutch, and output combination of FIG. 1.
Figure 3:
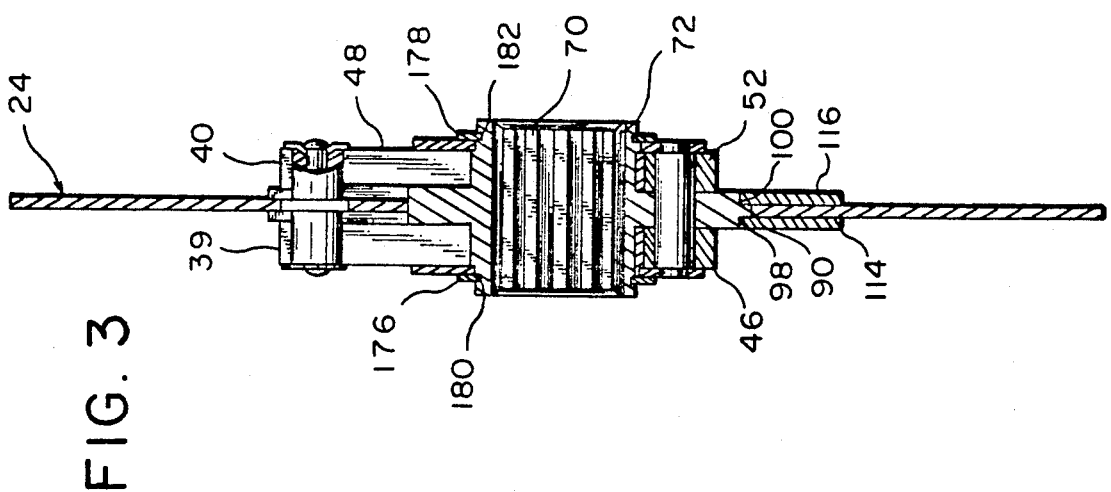
FIG. 3 is a side view of the disc assembly of FIG. 2 taken along line 3—3 of FIG. 2.

Referring now more specifically to FIGS. 2 and 3, where the disc assembly is shown separate from the clutch assembly 35, it is seen that the sets of beam springs 39 and 40 each include three beam springs. While FIG. 2 shows only one side of the disc assembly 24, the other side of the disc assembly is substantially identical so that the sets of beam springs 39 and 40 are identically arrayed. The beam springs set 39 includes beam springs 42, 44, and 46, while the beam spring set 40 (see also FIGS. 1 and 3) includes beam springs 48, 50, and 52. The beam springs 42 and 48 form a first pair of beam springs which are copivoted to the disc 30 at first ends thereof on a bushing 54 by a pin or rivet 56, while the second ends of the beam springs 42 and 48 are copivoted to the hub 28 by pin or rivet 58. The second beam springs 44 and 50 form a second pair of beam springs which are copivoted at their first ends on the disc 30 by a bushing 60 retained with a rivet 62, while the second ends of the beam springs 44 and 50 are copivoted on the hub 28 by a pin or rivet 64. The beam springs 46 and 52 form a third pair of beam springs which are copivoted at their first ends to the disc 30 by a bushing 66 and retained by a rivet 68 while being copivoted to the hub 28 by a pin or rivet 70.

The first and second ends of the beam springs 42 (48), 44 (50), and 46 (52) are pivoted at locations arcuately spaced about 180° from the second ends of the beam springs. Since the beam springs 42 (48), 44 (50), and 46 (52) are curved, they are nested one within the other in a spiral fashion.

Figure 4:
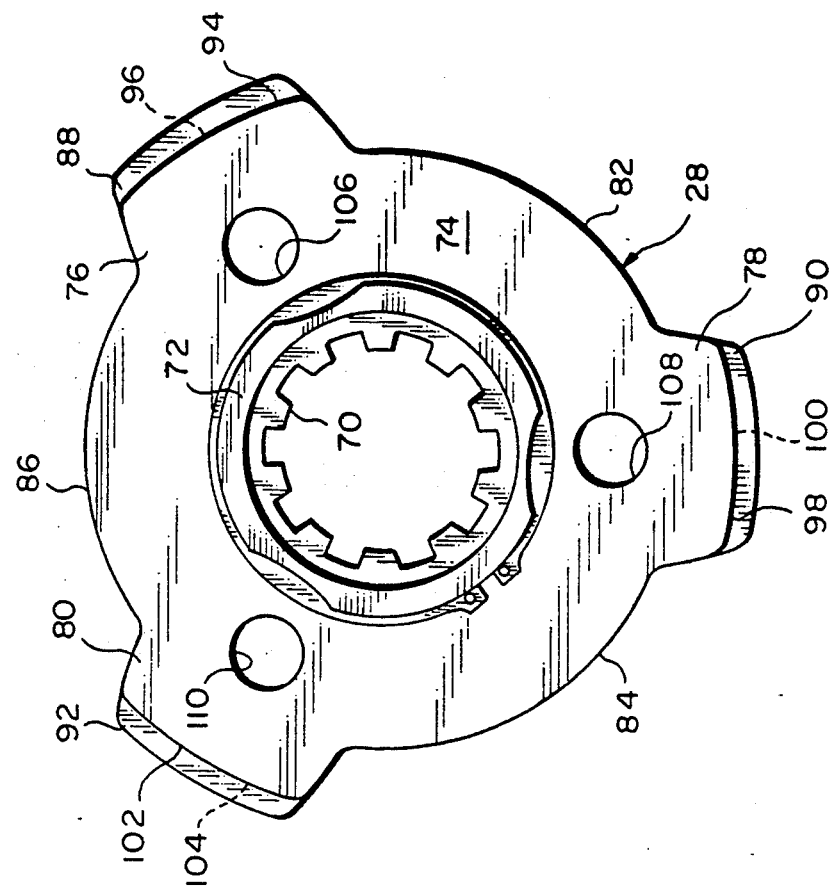
FIG. 4 is a front planar view of a hub forming part of the disc assembly of FIGS. 2 and 3, the back planar view being identical.

Since it is necessary for the disc 30 to be rotatable with respect to the hub 28 while being coaxially mounted thereon, the hub and disc are separate pieces. As is best seen in FIG. 4, the hub 28 includes splines 70 integral or unitary therewith for splined engagement with the output shaft 26 (FIG. 1). The splines 70 are positioned within an axially extending collar portion 72 of the hub 28, which collar portion has a radially projecting flange 74. The radially projecting flange 74 has three radial projections 76, 78, and 80 separated by arcuate peripheral spaces 82, 84, and 86. The radial projections 76, 78, and 80 have crowns 88, 90, and 92, respectively, which have thicknesses less than the thickness of the radial projections from which they extend to define pairs of shoulders 94, 96; 98, 100; 102, 104 (also see FIGS. 1 and 3). Circular holes 106, 108, and 110 are formed in the flange 74 and are positioned 120° apart in alignment with the projections 76, 78, and 80. As will be further explained hereinafter, the circular holes 106, 108, and 110 receive the pins 58, 64, and 70, retaining the beam springs 42-56 (see FIG. 2).

Figure 5:
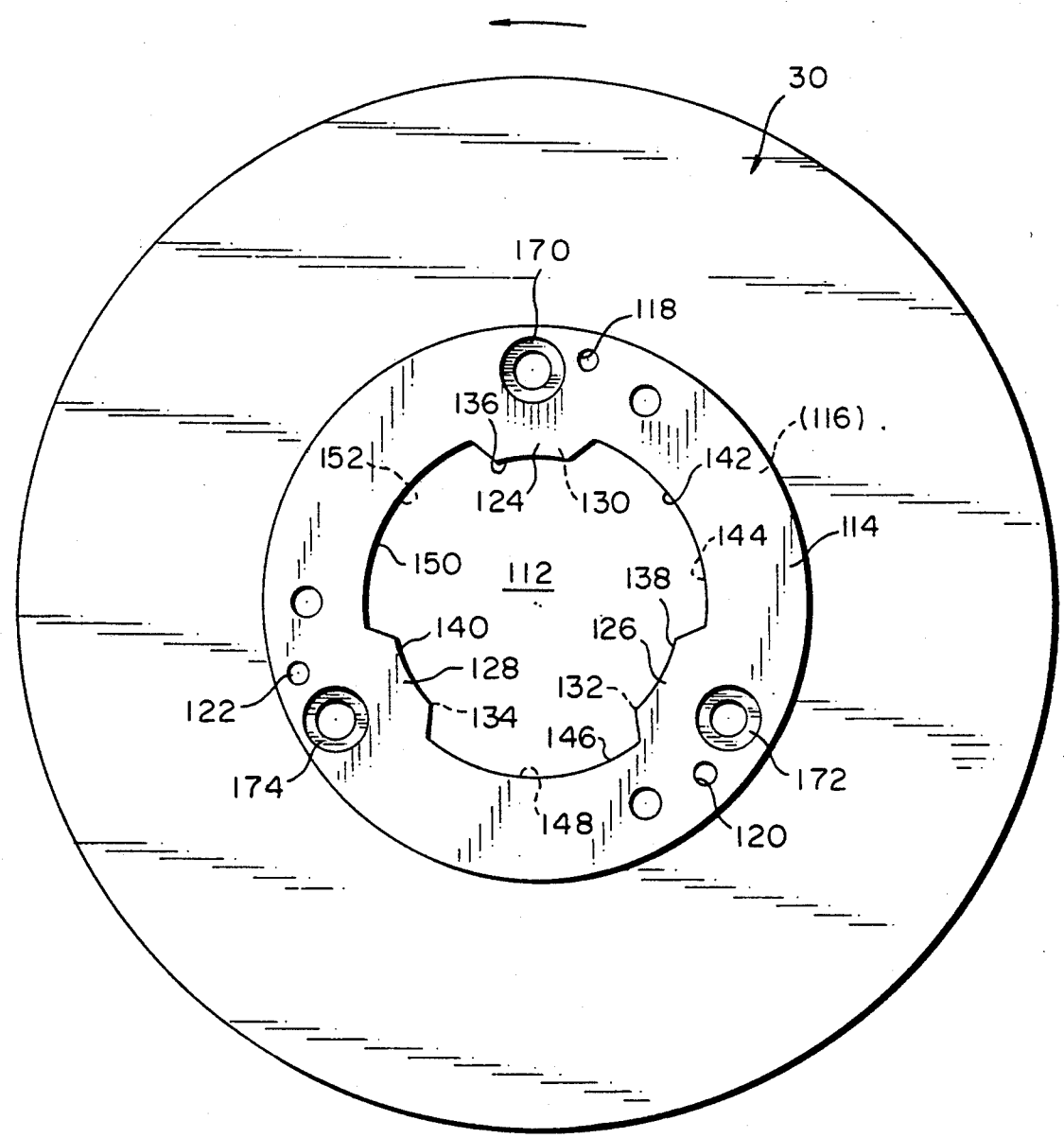
FIG. 5 is a front planar view of a disc forming part of the disc assembly of FIGS. 2 and 3, the back planar view being identical.
Figure 6:
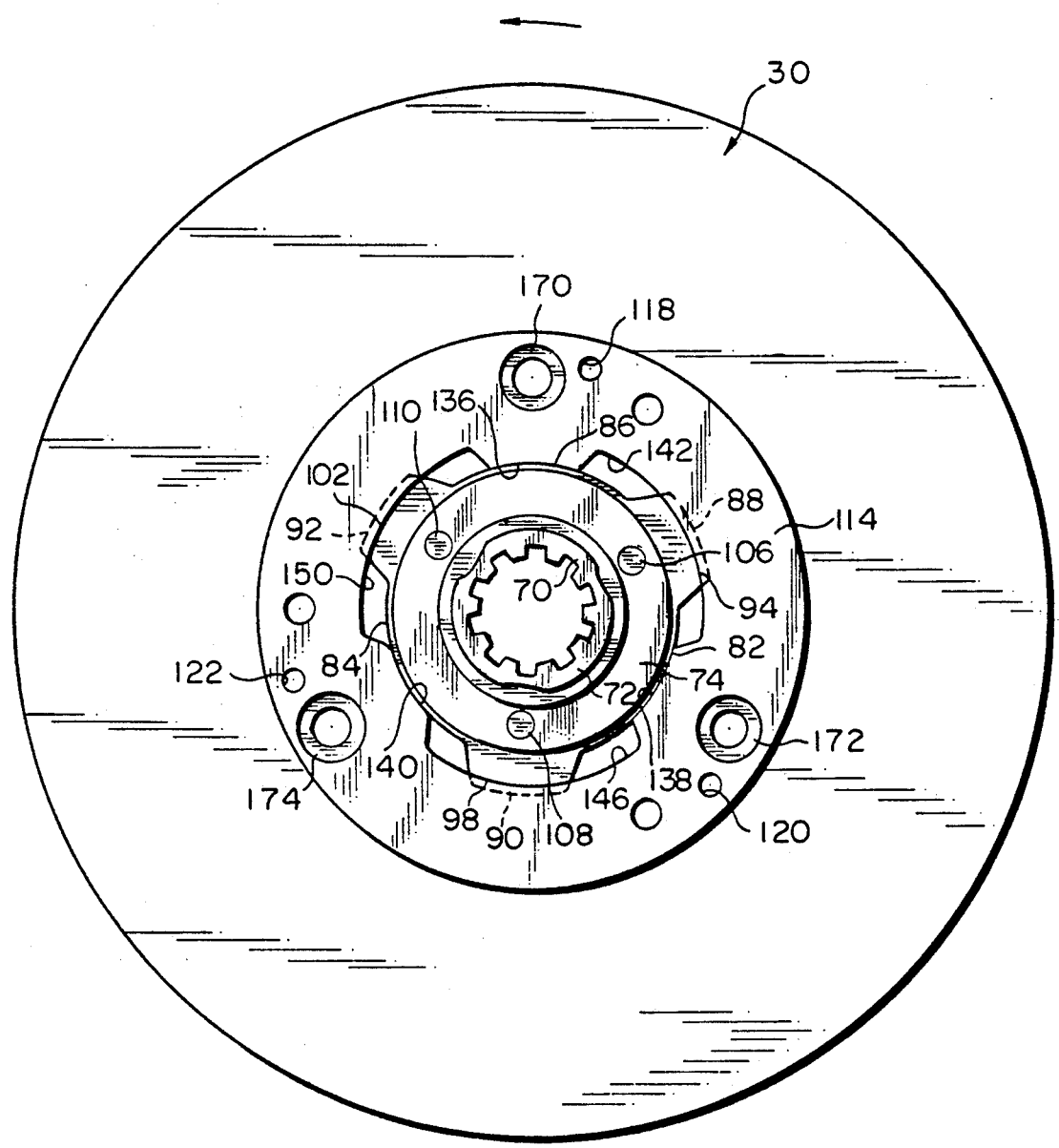
FIG. 6 is a front planar view of an assembly comprised of the hub of FIG. 6 and the disc of FIG. 5, the back planar view being identical.

Referring now to FIG. 4 in combination with FIGS. 5 and 6, the hub 28 fits within the axial opening 112 in the annual disc 30. The annular disc 30 has a pair of circular flanges 114 and 116 riveted to opposite sides thereof by rivets 118, 120, and 122. The flange 114 has three projections 124, 126, and 128, which are axially aligned with flanges 130, 132, and 134 on the circular flange 116. These projections have arcuate inner peripheries 136, 138, and 140 thereon, which face the arcuate peripheral spaces 82, 84, and 86 of the hub 28. As is seen in FIG. 6, the crowns 88, 90, and 92 of the hub 28 (FIG. 4) are received between arcuate, inner peripheral portions 142, 144; 146, 148; and 150, 152 of the flanges 114 and 116, which are spaced apart the thickness of the annular disc 30.

Assembly of the disc 30 and hub 28 is accomplished by positioning either the annular flange 114 or 116 proximate the opening 112 through the annular disc 30 and then placing the hub 28 within the flange with the crowns 88, 90, and 92 projecting beyond the inner peripheral portions 144, 148, and 152 of the flange 116. The flange 114 is then mounted over the other side of the crowns 88, 90, and 92 and the flanges 114 and 116 riveted together by the rivets 118, 120, and 122. The beam springs 42, 48; 44, 50; and 46, 52 are then attached to the hub 28 by bushings 154, 156, and 158 (FIG. 2) which extend through the holes 106, 108, and 110 (FIG. 4) in the hub. The rivets 58, 64, and 70 (FIG. 2) pass through the bushings 154, 156, and 158 and are received in holes through first and second retaining rings 162 and 164, which retaining rings are disposed outboard of the beam spring pairs 42, 48; 44, 50; and 46, 52 to hold the beam springs between the retaining rings and the circular flange 74 of the hub 28. The first ends of the beam spring pairs 42, 48; 44, 50; and 46, 52 are retained as previously mentioned by the bushings 54, 60, and 66, which pass through circular openings 170, 172, and 174 in the annular disc 30 (FIG. 5). As is seen in FIGS. 1 and 3, spring retaining rings 176 and 178 are received in grooves 180 and 182 in the axially extending collar 72 of the hub to stabilize the beam spring assemblies 39 and 40 on the collar.

Figure 7:
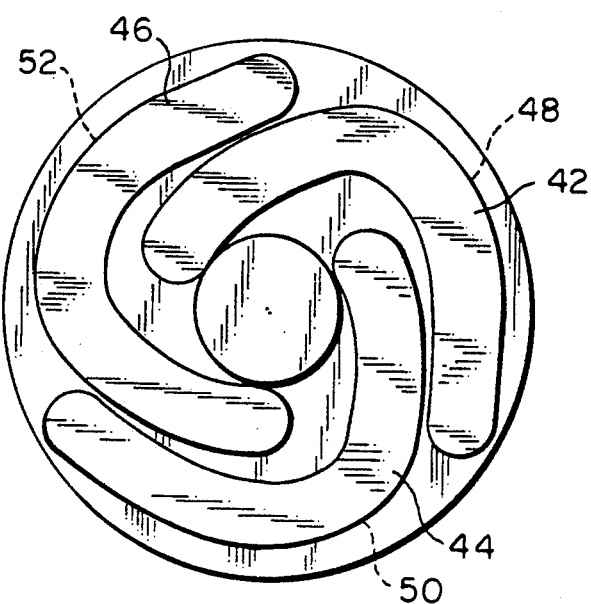
FIG. 7 is a diagrammatical view illustrating how nested beam springs configure in the rest mode of the flywheel and clutch assembly of FIG. 1.
Figure 8:
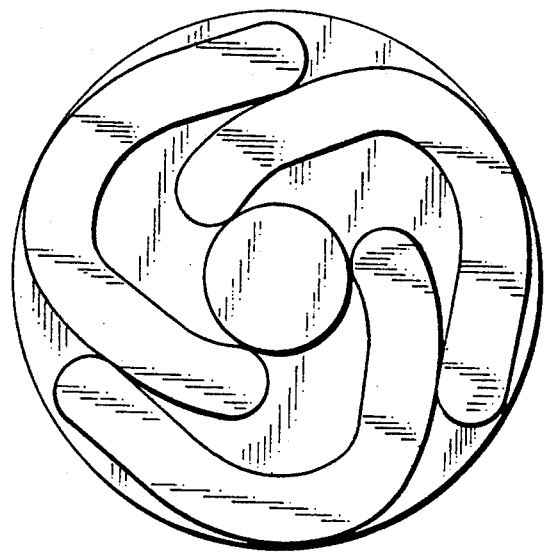
FIG. 8 is a view similar to FIG. 7 but showing how the beam springs flex when the flywheel and clutch assembly of FIG. 1 is in the drive mode.
Figure 9:
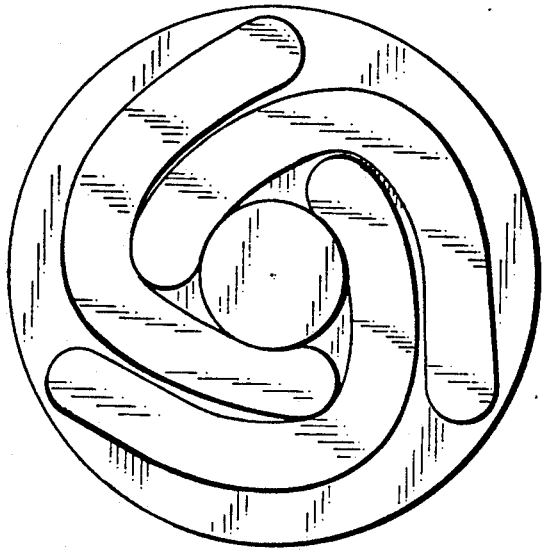
FIG. 9 is a view similar to FIGS. 7 and 8 but showing how the nested springs flex when the flywheel and clutch assembly of FIG. 1 is in the coast mode.

Referring now to FIGS. 7, 8, and 9, it is seen that the beam spring pairs 42, 48; 44, 50; and 46, 52 expand outwardly when rotated from the rest mode of FIG. 7 to the drive mode of FIG. 8 and contract inwardly when in the coasting mode of FIG. 9. As is seen in a specific embodiment illustrated in FIG. 8, the flywheel 20 (FIG. 1), which engages the disc 30, is leading the hub 28 by about 22° due to outward flexure of the beam springs 42-52 when the flywheel-clutch assembly 35 of FIG. 1 is in the drive mode. When the flywheel-clutch assembly 35 of FIG. 1 is in the coast mode, as in FIG. 9, the ends of the beam springs 42-52 tend to squeeze together, with the hub 28 and drive shaft 26 (FIG. 1) leading the flywheel 20 (FIG. 1). In the specific embodiment of FIG. 9, the drive shaft 26 is leading the flywheel by about 19°. As one can readily see, there is a total angular displacement range of approximately 41° between the flywheel 20 and output shaft 26 to provide long travel. As will be further explained hereinafter, this arrangement provides relatively soft and partially negative spring characteristics, with low hysteresis at idle. The soft spring characteristics and long travel minimize resonances of the drive train while in the drive mode. Moreover, the arrangement introduces geometric non-linearities, which lower the elastic rate and increase torque capacity due to long travel of the beam springs 42-52 as they bend.

Generally, the instant invention contemplates an undeflected angular displacement in the range of about 150° to 210° between the second ends of the beam springs 42-52, which are each attached to the hub 28, and the first ends of the beam springs, which are attached to the annular driven disc 30. In a more specific aspect, the range of displacement between the first and second ends of the beam springs is about 170° to about 190°, and, in a still more specific aspect, the displacement is in the range of about 175° to about 185°.

Referring now to FIG. 10, there is schematically shown a single beam spring 42 anchored at its first end to the disc 30 by the pin or rivet 56 and at its second end to the hub 28 by the pin or rivet 58. Each of the other beam springs 44, 46, 48, 50, and 52 functions substantially identically to the beam spring 42. It is seen in FIG. 10 that the pin 70 is displaced by the angle e slightly more than 180° from the pin 56. This additional angular displacement angle $\theta$ introduces a partially negative spring characteristic which minimizes gear rattle at idle in the associated drive train.

Figure 11:
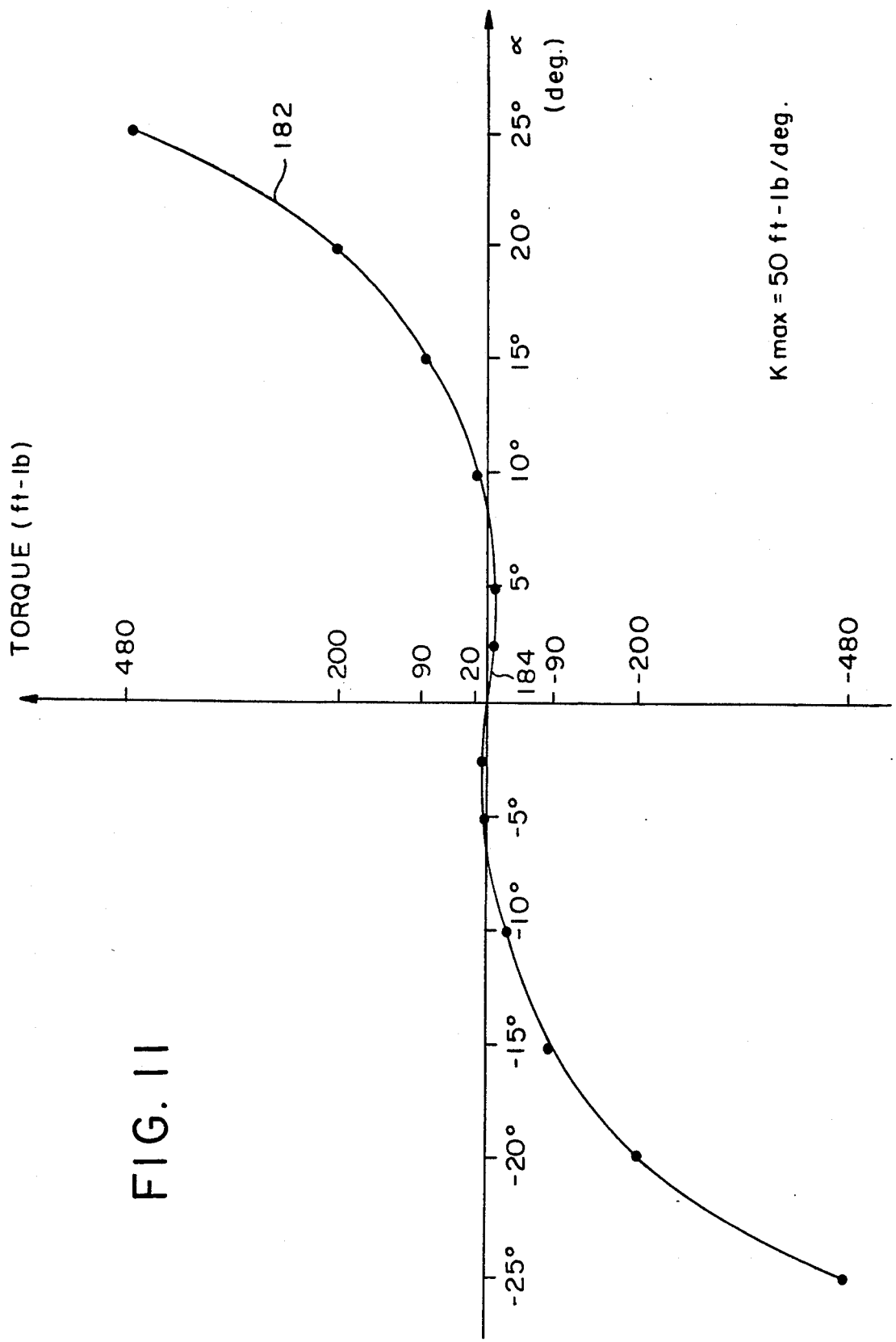
FIG. 11 is a graph plotting torque as a function of angular displacement with respect to the illustration of FIG. 10.

Referring now to FIG. 11, torque in ft.-lbs. is plotted as a function of angular displacement $\alpha$ from the 180° line 180 of FIG. 10. The curve 182 has a portion 184 therein between 0° and 5° in which negative torque is introduced despite positive or driving rotation through the flywheel clutch assembly 35 of FIG. 1.

Referring now to FIG. 12, a second embodiment 200 of the invention includes a plurality of identical beam springs 202, 204, 206, and 208, each having first ends pivoted on the disc 30 by pins 210, 212, 214, and 216, and second ends pivoted on the hub 28 by pins 218, 220, 222, and 224, respectively. The pins 218, 220, 222, and 224 at the second ends are spaced about 0° from the first pins 210, 212, 214, and 216. Generally, the range of arcuate spacing between the first and second pivoted ends of the beam springs 202, 204, 206, and 208 is the range of about +30° to about −30°.

Referring now to FIG. 13, there is shown a portion of one of the beam springs, such as the beam spring 42, wherein a radially extending oval slot 186 is provided to receive one of the bushings, such as the bushing 156, and the associated pin or rivet 58 so as to connect the beam spring 42 to the hub 28. The oval slot 186 provides a guide for connecting the pin or rivet 58 to the hub 28 and, if desired, also can serve to minimize negative torque if so desired.

Without further elaboration, it is believed that one skilled in the art can, using the preceding description, utilize the present invention to its fullest extent.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A disc assembly useful as a damper when disposed between a flywheel and a shaft, the disc assembly comprising:
 a hub secured circumferentially to the shaft, the hub including outwardly extending radial projections;
 a disc separate from the hub and concentrically positioned with respect thereto, the disc including a central opening bordered by an arcuate groove which receives portions of the outwardly extending radial projections;
 a plurality of beam springs, wherein each beam spring has a first end and a second end, the first ends of the beam springs being attached to the disc at first points, and the second ends of the beam springs being attached to the hub at second points which are angularly displaced when undeflected about 150° to about 210° from the first points, the beam springs being engaged only at the ends thereof.

2. The disc assembly of claim 1, wherein the plurality of beam springs are arranged in pairs with beam springs disposed on opposite sides of the disc assembly.

3. The disc assembly of claim 2, wherein there are three pairs of beam springs, with the first ends thereof anchored to the disc at 120° intervals and the second ends thereof mounted to the hub at 120° intervals.

4. The disc assembly of claim 1, wherein the second ends of the beam springs are anchored to the hub at locations aligned with the projections.

5. The disc assembly of claim 4, wherein the disc includes inwardly extending projections disposed between the outwardly extending projections of the hub.

6. The disc assembly of claim 1, wherein the second points are displaced about 180° from the first points.

7. In a drive train including a flywheel having a driving surface, a disc assembly in proximity with the driving surface, and a clutch plate for normally urging the disc assembly into engagement with the driving surface, the disc assembly comprising a hub fixed circumferentially to a shaft and a disc coaxially mounted with respect to the hub and the shaft; the improvement comprising: a plurality of beam springs, each having first and second ends wherein the first ends of each of the beam springs are pivoted to the disc at first pivotal locations and the second ends of each of the beam springs are pivoted to the hub at second pivotal locations which, for each beam spring, are angularly displaced from the first pivotal locations when undeflected by an angle in the range of greater than 180° but less than about 210°, the angle being sufficient to provide a partially negative spring characteristic during operation of the drive train; the beam springs being engaged only at the ends thereof.

8. The combination of claim 7, wherein the angular displacement of the pivotal locations from one another greater than 180° but less than about 190°.

9. The combination of claim 8, wherein the angular displacement of the pivotal locations from one another greater than 180° but less than 185°.

10. The improvement of claim 9, wherein the angular displacement of the pivotal locations from one another is about 180°.

11. The improvement of claim 7, wherein the plurality of beam springs are arranged in pairs with beam springs disposed on opposite sides of the disc assembly.

12. The improvement of claim 7 wherein there are three pairs of beam springs, with the first ends thereof anchored to the disc at 120° intervals and the second ends thereof mounted to the hub at 120° intervals.

13. The improvement of claim 7, wherein the hub includes a plurality of outwardly extending radial projections, and the disc includes a central opening bordered by an arcuate groove which receives portions of the outwardly extending radial projections.

14. The improvement of claim 13, wherein the second ends of the beam springs are anchored to the hub at locations aligned with the projections.

15. The improvement of claim 14, wherein the disc includes inwardly extending projections disposed between the outwardly extending projections of the hub.

16. The improvement of claim 7, wherein the beam springs are anchored in the hub with pins and wherein each beam spring has an elongated slot for receiving the pin anchoring the beam spring to the hub.

17. In a drive train including a flywheel having a driving surface, a disc assembly in proximity with the driving surface, and a clutch plate for normally urging the disc assembly into engagement with the driving surface; the disc assembly comprising a hub fixed circumferentially to a shaft and a disc coaxially mounted with respect to the hub and the shaft; the improvement comprising: a plurality of outwardly extending radial projections on the hub and a central opening through the disc bordered by an arcuate groove which receives portions of the outwardly extending radial projections on the hub; a plurality of beam springs, each having first and second ends wherein the first ends of each of the beam springs are pivoted to the disc at first pivotal locations and the second ends of each of the beam springs are pivoted to the hub at second pivotal locations which, for each beam spring, are angularly displaced from the first pivotal locations when undeflected by about 150° to 210°, the beam springs being engaged only at the ends thereof.

18. The improvement of claim 17, wherein the second ends of the beam springs are anchored to the hub at locations aligned with the projections.

19. The improvement of claim 18 wherein the disc includes inwardly extending projections disposed between the outwardly extending projections of the hub.

20. The improvement of claim 19, wherein the beam springs are anchored to the hub with pins and wherein each beam spring has an elongated slot for receiving the pin anchoring the beam spring to the hub.

21. In a drive train including a flywheel having a driving surface, a disc assembly in proximity with the driving surface, and a clutch plate for normally urging the disc assembly into engagement with the driving surface, the disc assembly comprising a hub fixed circumferentially to a shaft and a disc coaxially mounted with respect to the hub and the shaft; the improvement comprising a plurality of beam springs, each having first and second ends wherein the first ends of each of the beam springs are pivoted to the disc at first pivotal locations and the second ends of each of the beam springs have elongated slots therein which are pivoted on pins projecting from the hub at second pivotal locations which, for each beam spring, are angularly displaced when undeflected from the first pivotal locations by about 150° to 210°, the beam springs being engaged only at the ends thereof.

* * * * *